United States Patent
Huber

(10) Patent No.: US 7,556,462 B2
(45) Date of Patent: Jul. 7, 2009

(54) CARGO DECK

(75) Inventor: Thomas Huber, Schliersee (DE)

(73) Assignee: Telair International GmbH, Miesbach (DE)

( * ) Notice: Subject to any disclaimer, the term of this patent is extended or adjusted under 35 U.S.C. 154(b) by 324 days.

(21) Appl. No.: 11/082,140

(22) Filed: Mar. 16, 2005

(65) Prior Publication Data

US 2005/0224645 A1    Oct. 13, 2005

(30) Foreign Application Priority Data

Mar. 22, 2004  (DE) ................. 10 2004 013 909
Mar. 25, 2004  (DE) ................. 10 2004 014 745

(51) Int. Cl.
*B60P 7/08*    (2006.01)
(52) U.S. Cl. ............... 410/92; 410/77; 410/78; 410/80
(58) Field of Classification Search ............... 410/92, 410/94–95, 77–80; 244/137.1, 118.1; 193/35 R, 193/35 C, 37, 35 MD; 414/536
See application file for complete search history.

(56) References Cited

U.S. PATENT DOCUMENTS 4,234,278 A * 11/1980 Harshman et al. ............. 410/69

FOREIGN PATENT DOCUMENTS

DE    29 08 400    9/1980
DE    103 24 648   12/2004

* cited by examiner

*Primary Examiner*—Stephen Gordon
(74) *Attorney, Agent, or Firm*—Baker & Hostetler LLP

(57) ABSTRACT

In the cargo hold of an aircraft, a cargo deck is known on which several mounting profiles are installed in the long direction of the aircraft. In the mounting profiles functional elements, in particular rollers, ball elements, latches, power drive units (PDUs) or the like can be mounted. In the present invention it is proposed that the mounting profiles be disposed at identical distances from one another over a width of the cargo space, so that identical structural floor elements can be mounted between them and will fit exactly.

7 Claims, 2 Drawing Sheets

CARGO DECK

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a cargo deck for a cargo hold of an aircraft.

BACKGROUND OF THE INVENTION

Patent DE 29 08 400 discloses a cargo deck of this kind for a large-scale aircraft, in which a total of six rows of mounting profiles are installed in the long direction of the aircraft. Within the mounting profiles are mounted support rollers, latch elements, power drive units (PDUs) and other such functional elements. Between the mounting profiles floor elements are attached, i.e. floor plates lacking functional elements, or also ball mats—that is, floor elements in which ball elements are installed close to one another, so that items of freight can be pushed over them in any desired direction.

When such a cargo space is being loaded, the containers or pallets are transported in through a cargo-space door and then, traveling on the rollers disposed in the mounting profiles, are moved to a storage position within the cargo space, where they are held in place by means of latch elements that may be disposed in the mounting profiles or on the cargo deck between mounting profiles. Such containers or pallets are standardized and adapted to the cross-sectional shape of the cargo space. In this regard basically two different types of containers or pallets can be distinguished, namely those that extend over the entire width of the cargo space and those that are only half as wide, so that two such containers can be fastened side by side in the cargo space.

This known cargo deck has an extraordinarily elaborate configuration.

BRIEF SUMMARY OF THE INVENTION

It is thus an object of the present invention to provide a cargo deck for a cargo hold of an aircraft such that using it requires less effort to use whilst still providing good functionality.

According to the present invention there is provided a cargo deck for a cargo hold of an aircraft comprising a plurality of mounting profiles, which are installed in a longitudinal direction of the aircraft and in which functional elements comprising at least one of rollers, ball elements, latches, and power drive units (PDUs) can be mounted; and a plurality of floor elements comprising at least one of a ball mat and a floor plate; the mounting profiles, as viewed over a width of the cargo hold, being located at identical distances from one another in order that identical floor elements can be mounted between them with an exact fit.

Hence, whereas in the known cargo deck the mounting profiles are separated by different distances, the aim of the present invention is that absolutely identical distances should be maintained between the mounting profiles. Therefore all floor elements, both floor plates or floor panels and also ball mats, must be available in only one size and hence are interchangeable. This means not only that storage of these elements is simplified; rather, the tools used to assemble such floor elements, which are usually constructed as extruded profiles, can also be provided in smaller numbers.

Yet another simplification results when the mounting profiles themselves are all equally wide. Here, again, improved exchangeability and reduced effort and expense in manufacturing are thereby obtained.

Preferably, an odd number of mounting profiles are arrayed next to one another, i.e. 5, 7 or 9 mounting profiles, preferably 7, so that a single one of these mounting profiles is positioned exactly in the middle of the cargo deck. As a result it is possible to achieve a considerable simplification and saving of weight in comparison to the state of the art as described above.

In the central mounting profile there are preferably provided roller units, each of which is subdivided into a first and a second roller-unit part; these roller-unit parts can be moved independently of one another so that one item of freight can be stationary with its edge supported by one of the roller-unit parts, while another item of freight, with its edge seated on the other roller-unit part, is being transported. That is, whereas in the known arrangement two separate roller conveyors are provided, in the design in accordance with the invention a compact and nevertheless functional structure is achieved in a single mounting profile by means of a special roller arrangement (division of a roller unit into separate parts).

Customarily along the side edges of such a cargo space guide strips are provided, which can also be constructed as individual roller elements and which serve to keep containers that have been pushed into the cargo space at a distance from the walls, and to guide their movement. The mounting profiles installed next to these lateral guide strips or individual rollers are preferably spaced apart from the strips or rollers by a distance such that if a container strikes against the guide strip or roller, the profile at the edge of the container is positioned over the mounting profile. This measure ensures that the container will be optimally supported even in the case of narrow rollers and correspondingly narrow mounting profiles.

The distances between the mounting profiles are preferably made such that two containers, each of which extends over half the width of the cargo space and which are uniformly loaded, for example in the case of Boeing LD3 containers, are situated with their centers of gravity above a mounting profile. As a result, a particularly stable and, for the containers, secure support is ensured.

Preferred embodiments of the invention will be now described by way of example with reference to the accompanying drawings.

DETAILED DESCRIPTION OF THE INVENTION

Figure 1:
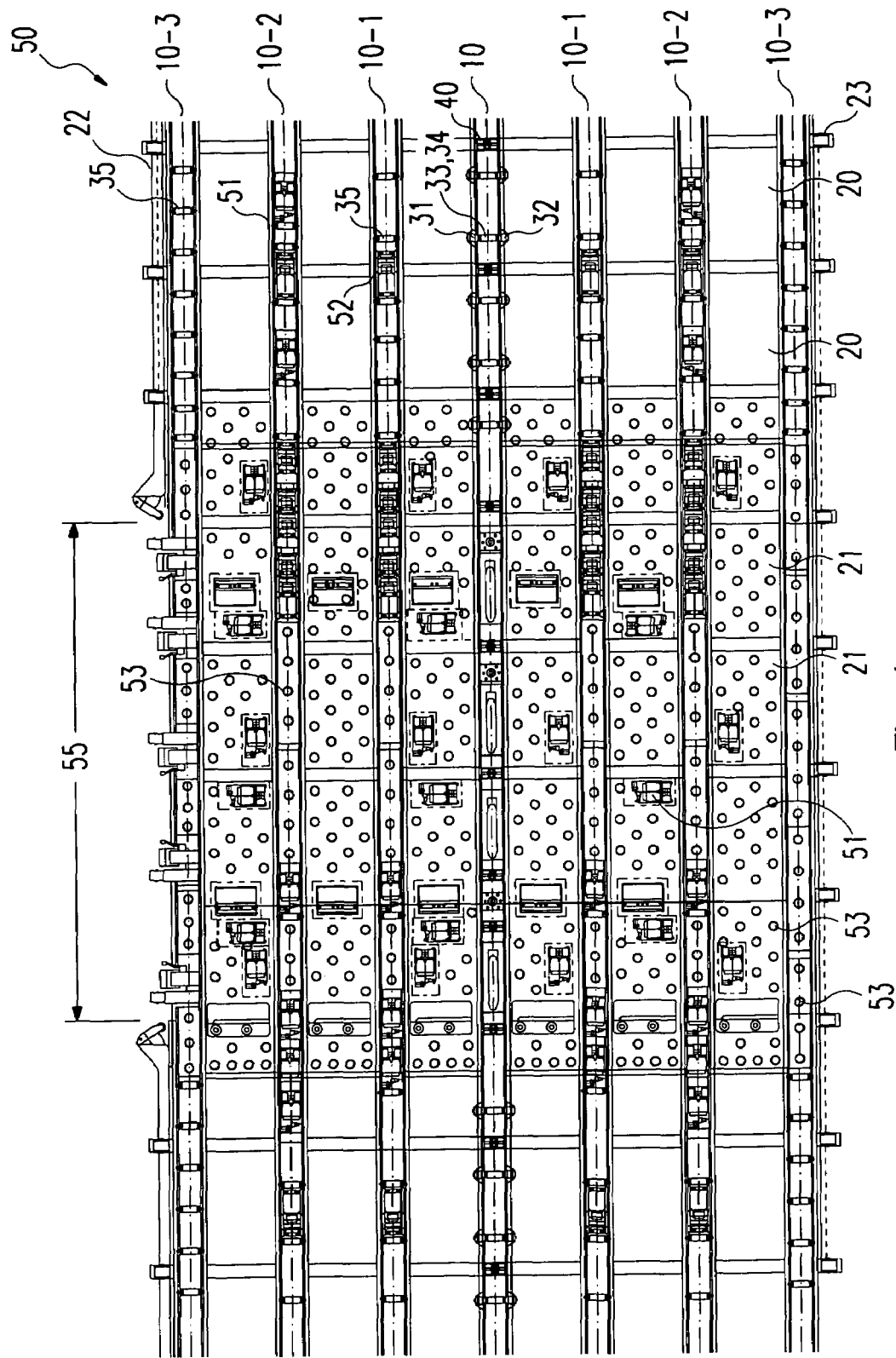
FIG. 1 is a plan view of an embodiment of cargo deck according to the present invention.

In the following description, the same reference numerals are used for identical parts and parts with identical actions.

FIG. 1 shows a plan view of a cargo deck 50 of a large-scale aircraft. There a total of seven mounting profiles 10 are installed at identical distances from one another, and between them are disposed floor panels 20 and ball mats 21, all of which have the same width so that they can be made from a single kind of hollow profile and hence can be produced with only one tool.

Along the edges of the cargo deck 50 are provided guide strips 22, 23 equipped with corresponding rollers.

In the mounting profiles 10 the following elements (described in greater detail below) are disposed: external rollers 31, 32, centrally subdivided rollers 33, 34, undivided rollers 35, latches 40, 52 and power drive units (PDUs) 51. Furthermore, in a door region 55, where the ball mats 21 are located so that a container coming through the door in a direction transverse to the mounting profiles 10 (the rollers of which can convey objects in only one direction) can be rotated appropriately, additional ball elements 53 are attached in mounting rails within the mounting profiles 10.

Figure 2:
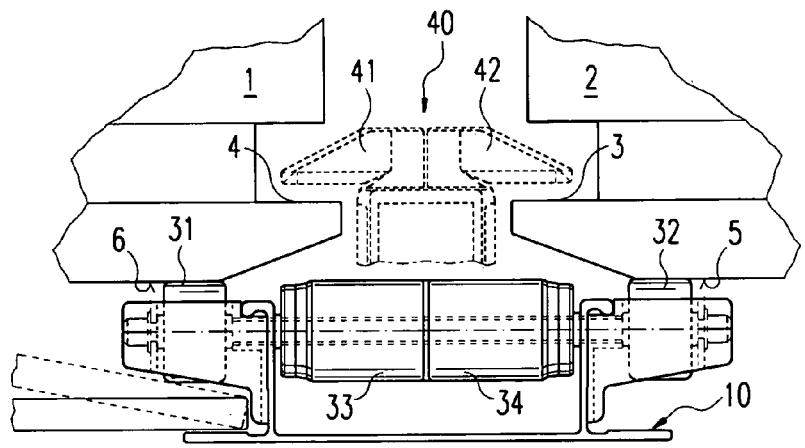
FIG. 2 is a front view of a mounting profile with support rollers on which containers are supported.
Figure 3:
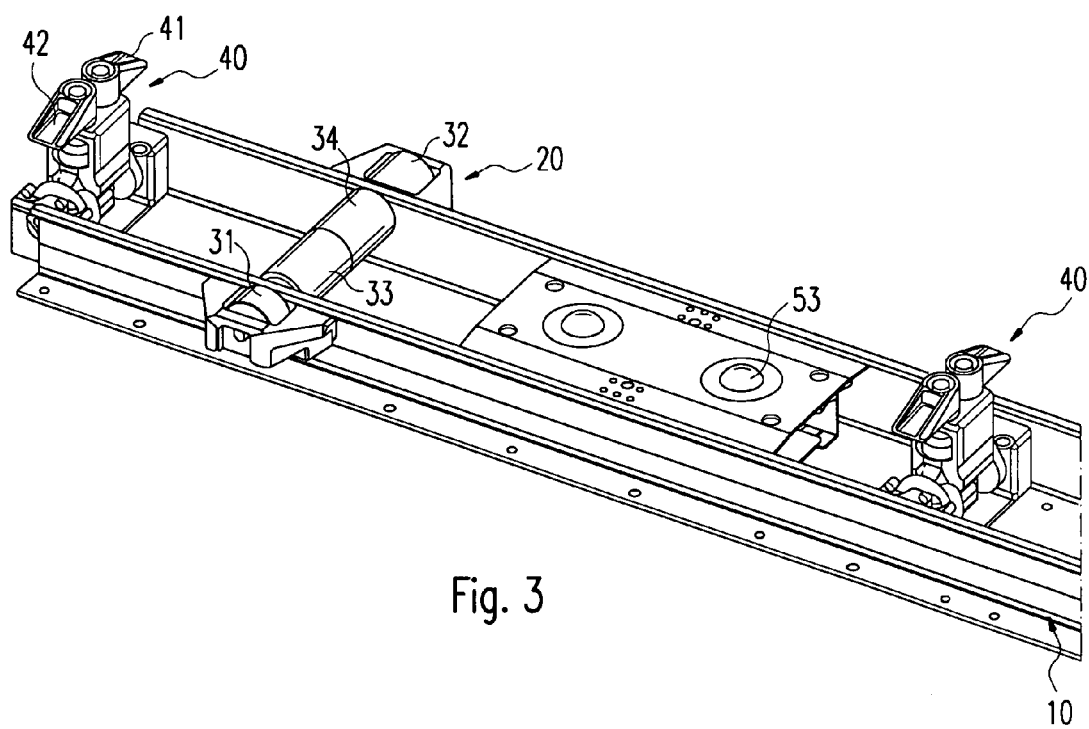
FIG. 3 is a perspective view of the arrangement shown in FIG. 2.

In FIG. 2 the central mounting profile 10 is shown in front view as well as two containers 1, 2 with their edge profiles 5, 6 resting on external rollers 31, 32 that extend outward from the mounting profile 10. Between the containers 1, 2, attached in the mounting profile 10 (as can readily be seen in FIG. 3), there are latches 40, the claws 41, 42 of which can be brought into engagement with locking edges 3, 4 of the containers 1, 2 in order to secure the containers so that they cannot move in the direction transverse to the long axis of the aircraft. The containers 1, 2 thus have their stiffest sections, namely the edge profiles 5, 6, seated on the quite narrow rollers 31, 32. This is accomplished with only a single roller conveyor, formed by the mounting profile 10.

As indicated in FIG. 2, the roller disposed in the central region within the mounting profile 10 can be subdivided into two roller parts 33, 34. In particular when the central mounting profile 10 is appropriately wide, the external rollers 31, 32 can be eliminated, in which case the arrangement is dimensioned such that the central roller parts 33, 34 extend far enough that they are below the edge profiles 5, 6 of the containers 1, 2. The embodiment shown here, however, which includes the external rollers 31, 32, offers the advantage that all the mounting profiles 10 can be made identical in structure.

It can be seen from the above that an essential point of the invention resides in creating a structure for a cargo-space floor that is symmetrical and consists of substantially identical components. The advantage on one hand is that fewer mounting profiles are needed (which provides savings in both costs and weight), while on the other hand only a few different kinds of components must be kept in store, at least as far as the "semifinished products" (extruded profiles) are concerned.

LIST OF REFERENCE NUMERALS

1 Container
2 Container
3 Locking edge
4 Locking edge
5 Edge profile
6 Edge profile
10 Mounting profile
20 Floor plate
21 Ball mat
22 Guide strip
23 Guide strip
31 1st external roller
32 2nd external roller
33 1st central roller part
34 2nd central roller part
35 Undivided roller
40 Latch
41 1st claw
42 2nd claw
50 Cargo deck
51 Power drive unit (PDU)
52 Latch
53 Ball element
55 Door region

The invention claimed is:

1. A cargo deck for a cargo hold of an aircraft comprising:
a plurality of mounting profiles, which are installed in parallel in a longitudinal direction of said aircraft and in which functional elements comprising at least one of rollers, ball elements, latches, and power drive units can be mounted; and
a plurality of identically sized floor elements comprising at least one of a ball mat and a floor plate, wherein
said mounting profiles, as viewed over a width of said cargo hold, are located at identical distances from one another in order that said identically sized floor elements can be mounted between them with an exact fit, and
said cargo deck comprises, in total, an odd number of said mounting profiles.

2. The cargo deck according to claim 1, wherein said mounting profiles all have the same width.

3. The cargo deck according to claim 1, wherein a central mounting profile of said plurality of mounting profiles is provided with a subdivided roller unit comprising a first roller and a second roller installed in such a way that a first item of freight can stand with its edge on one of said first and second rollers and another item of freight can be transported with its edge on the other of said first and second rollers.

4. The cargo deck according to claim 1, comprising:
one or more lateral guide strips, each of which is provided adjacent a respective one of said plurality of mounting profiles, wherein
each of said one or more lateral guide strips is spaced from said respective adjacent one of said plurality of mounting profiles such that a profile at an edge of a freight container that strikes the respective guide strip is situated above said respective adjacent one of said plurality of mounting profiles.

5. The cargo deck according to claim 1, wherein said plurality of mounting profiles are arranged such that two freight containers, which each extends over half a width of said cargo deck and which are uniformly loaded, each has its center of gravity situated above one of said plurality of mounting profiles when said freight containers are adjacently arranged on said cargo deck so as to extend across said width.

6. An aircraft cargo deck for a cargo hold of an aircraft comprising:
a plurality of mounting profiles, which are installed in a longitudinal direction of said aircraft and in which functional elements comprising at least one of rollers, ball elements, latches, and power drive units can be mounted; and a plurality of identically sized floor elements comprising at least one of a ball mat and a floor plate, wherein said mounting profiles, as viewed over a width of said cargo hold, are located at identical distances from one another in order that said identically sized floor elements can be mounted between them with an exact fit, said cargo deck comprises, in total, an odd number of said mounting profiles, and a central mounting profile of said plurality of mounting profiles is provided with a subdivided roller unit comprising a first roller and a second roller installed in such a way that a first item of freight can stand with its edge on one of said first and second rollers and another item of freight can be transported with its edge on the other of said first and second rollers.

7. A cargo deck for a cargo hold of an aircraft comprising:

a plurality of mounting profiles, which are installed in a longitudinal direction of said aircraft and in which functional elements comprising at least one of rollers, ball elements, latches, and power drive units can be mounted; and a plurality of identically sized floor elements comprising at least one of a ball mat and a floor plate, wherein said mounting profiles, as viewed over a width of said cargo hold, are located at identical distances from one another such that said identically sized floor elements can be mounted between them with an exact fit, and said cargo deck comprises, in total, an odd number of said mounting profiles.

* * * * *